(12) United States Patent
Topp

(10) Patent No.: US 6,252,208 B1
(45) Date of Patent: Jun. 26, 2001

(54) METHOD FOR CONTROLLING HEATING CURRENT AND SEAT HEATING CONTROL CIRCUIT

(75) Inventor: Rainer Topp, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/554,938

(22) PCT Filed: Nov. 5, 1998

(86) PCT No.: PCT/DE98/03217

§ 371 Date: Jul. 14, 2000

§ 102(e) Date: Jul. 14, 2000

(87) PCT Pub. No.: WO99/27430

PCT Pub. Date: Jun. 3, 2000

(30) Foreign Application Priority Data

Nov. 25, 1997 (DE) .............................. 197 52 135

(51) Int. Cl.[7] ....................................... H05B 1/02
(52) U.S. Cl. .................... 219/497; 219/202; 219/481; 219/505

(58) Field of Search ................................... 219/494, 481, 219/505, 497, 501, 506, 499, 202–206, 483; 307/117

(56) References Cited

U.S. PATENT DOCUMENTS

| 4,002,882 | * | 1/1977 | McCutchen ........................ 219/499 |
| 4,167,663 | * | 9/1979 | Granzow, Jr. et al. ............. 219/497 |
| 5,075,537 |   | 12/1991 | Rothenberg et al. . |
| 5,105,067 | * | 4/1992 | Brekkestran et al. .............. 219/497 |

FOREIGN PATENT DOCUMENTS

| 41 41 224 | 6/1993 | (DE) . |
| 43 18 432 | 12/1994 | (DE) . |
| 197 08 867 | 9/1998 | (DE) . |

* cited by examiner

Primary Examiner—Mark Paschall
(74) Attorney, Agent, or Firm—Kenyon & Kenyon

(57) ABSTRACT

A method and a circuit for controlling the heating current of a seat heater as a function of temperature is described. The circuit has a temperature sensing element that is integrated into an assigned logic circuit. The method optimizes a seat heating control arrangement by using variable heating phase durations.

11 Claims, 5 Drawing Sheets

Fig. 7

| A | S |
|---|---|
| 10 min | 38°C |
| 5 min | 34°C |
| 0,5 min | 30°C |
| 0 min | 30°C |

METHOD FOR CONTROLLING HEATING CURRENT AND SEAT HEATING CONTROL CIRCUIT

FIELD OF THE INVENTION

The present invention relates to a method and a circuit, respectively, for controlling the heating current of seat heaters as a function of temperature type, in which the sensor element is positioned separately from a logic circuit and the temperature measurement and seat heating take place simultaneously, are already known described in german Patent No. 197 08 867.

SUMMARY OF THE INVENTION

The method according to the present invention and the circuit according to the present invention have the advantage over the conventional methods and circuits in that a greater integration of individual components into the seat heating system achieves a more economical system design, in particular lowering costs by simplifying the assembly procedure and thus reducing the number of system components to be assembled. The method according to the present invention improves the seat temperature measurement, in particular by positioning the sensor element for measuring the seat temperature in the direct vicinity of the circuit-breaker that switches the heating current. The high level of integration results in a miniaturized circuit such that it can be built into any area of the seat surface without disturbing the vehicle passenger's comfort while seated, thus providing an optimum temperature measurement of the seat surface. The reduced number of connections between the system components also increases system reliability. One particular advantage is the ability to adjust the heating phase duration to the temperature just measured, thereby providing a heating method that saves time and energy costs.

One simple implementation of the method is to store an assignment between heating phase durations and specific temperatures provided in an H-table in an (EE)PROM memory or ROM memory.

Varying the temperature comparison value as a function of the duration of the previous heating phase further improves the temperature measurement by more accurately taking into account the excess temperature of the sensor element compared to the overall seat, due to its close proximity to the circuit-breaker.

Positioning the circuit-breaker on a second chip that is separate from a first chip containing the sensor element and the logic circuit further reduces temperature measurement errors resulting from the spatial proximity between the sensor element and the circuit breaker, while continuing to guarantee miniaturization.

The temperature measurement method described above is further improved by connecting the (first) chip to a copper braid integrated into the seat.

BRIEF DESCRIPTION OF THE DRAWINGS

FIG. 7 shows a sensor temperature setpoint table.

FIG. 1 shows a seat heating circuit 1 having a heating element 2 that can be connected to a supply voltage $U_B$ via a control module 6. Control module 6 has a temperature input 9, a voltage terminal 10, a ground terminal 11, and a load terminal 12. The heating element is connected to ground as well as to load terminal 12. Voltage terminal 10 of control module 6 is connected to supply voltage $U_b$. Ground terminal 11 is connected to ground. Temperature input 9 is connected to the center tap of a voltage divider that is connected between ground and supply voltage $U_B$. and has a temperature selecting resistor 4 and an Negative Temperature Coefficient (NTC) thermistor resistor 5. The connection between the voltage divider and supply voltage $U_b$ passes over a switch 3. Control module 6 has a logic circuit 8 that receives power via ground terminal 11 and voltage terminal 10 and is also connected to temperature input 9. Control terminal 14 of the logic circuit is connected to the control input of circuit-breaker 7, whose break gap, in turn, switches the connection between voltage terminal 10 and load terminal 12. Circuit segment 21 marked by the broken line includes temperature selecting resistor 4, NTC thermistor resistor 5, and control module 6 and is explained in greater detail in the description of FIG. 2.

The control module detects the divider tap voltage from the voltage divider formed by both resistors 4 and 5, with the divider voltage representing a measure of the seat temperature due to NTC thermistor resistor 5 provided in the seat. Control module 6 then activates heating element 2 provided in the seat whenever the divider voltage exceeds a voltage reference that is permanently set in control module 6, i.e., when the seat temperature drops below a specific value. This control loop maintains the seat temperature at a constant level. According to the conventional methods and circuits art, the heating element and NTC thermistor resistor are provided as a separate physical assembly very close to the seat surface, while the temperature selecting resistor and control module are integrated separately from this assembly into a further electronic module in the instrument panel or attached to a further bracket beneath the seat, in a cable harness, or at the edge of the heating surface.

Figure 1:
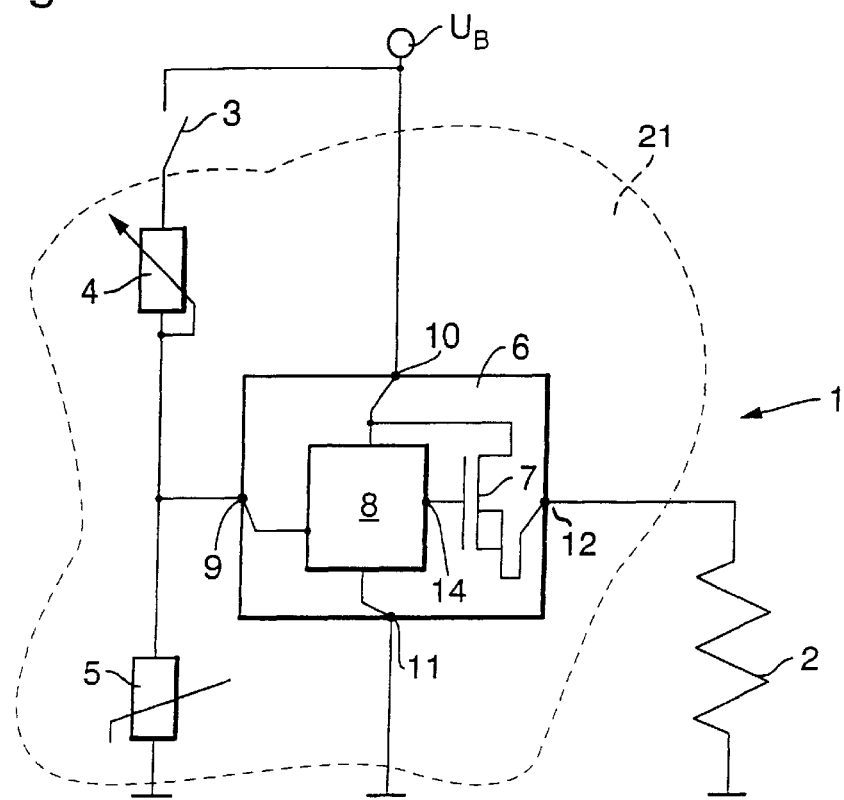
FIG. 1 shows a seat heating circuit.
Figure 2:
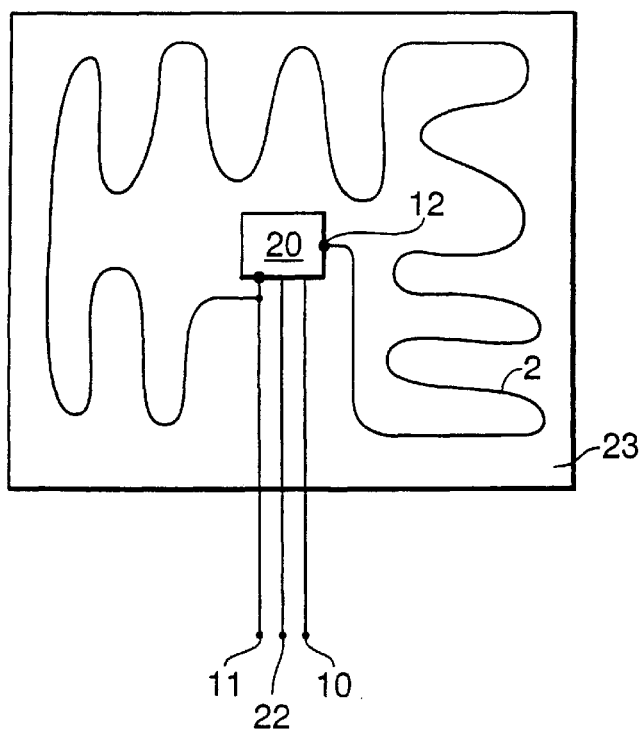
FIG. 2 shows an arrangement of a seat heating controller according to the present invention that is fully integrated into a car seat.

FIG. 2 shows a seat heating controller 20 that is fully integrated into a car seat 23. Seat heating controller 20 has a ground terminal 11, an on/off signal line 22, a voltage terminal 10, and a load terminal 12. Ground terminal 11 and load terminal 12 are electrically connected to a meandering heating element 2.

Circuit segment 21 is integrated into heating controller 20 and provided on a chip, with the on/off switch and heating element being the only other components needed to form a complete seat heating system. Fully integrated seat heating controller 20 can be designed as a very compact and small element provided in a conventional power enclosure and thus installed at the location in the system where the NTC thermistor resistor is commonly provided to ensure an optimum temperature measurement, and thus can be located anywhere on the heater winding plane of the system. Logic circuit 8 of circuit segment 21 executes a control algorithm that ensures temperature measurement and seat temperature control without allowing the latter to be significantly disturbed by the intrinsic heating of integrated circuit-breaker 7, which always occurs to some extent with a circuit-breaker.

In addition to the terminals of integrated seat heating controller 20 illustrated in FIG. 2, other terminals can also be provided for additional optional functions, such as a set temperature changeover, error feedback, lamp driver, etc. Additional functions such as power interruption detection, overload cutoff, overheating cutoff, etc. can also be integrated. Other ways of optimizing fully integrated seat heating controller 20 include thermally connecting the cooling surface of the power enclosure holding the seat heating controller to a flexible copper braid to better adjust the heat to the seat surface on the heater winding plane, thereby making the element's temperature measurement even less dependent on intrinsic heating and more dependent on the seat surface temperature. This can also be done with a circuit-breaker design having an impedance that is as low as possible and activates the heating current. A further embodiment of integrated seat heating controller 20 involves integrating all the functions described above into two semiconductor chips and mounting both chips together in a housing, forming a functional unit. In this case, it is advantageous to construct the power output stage only as a power MOS transistor in a single element, possibly also with current and temperature sensing outputs to support the fail-safe functions of the controller, and to design all the other functions, such as the temperature sensor and logic circuit, as a second element in the form of an integrated signal circuit. This further supports an economical switching output stage design with an impedance that is as low as possible, at the same time improving thermal decoupling between the power output stage and the temperature sensing circuit, which are located directly next to each other.

Figure 3:
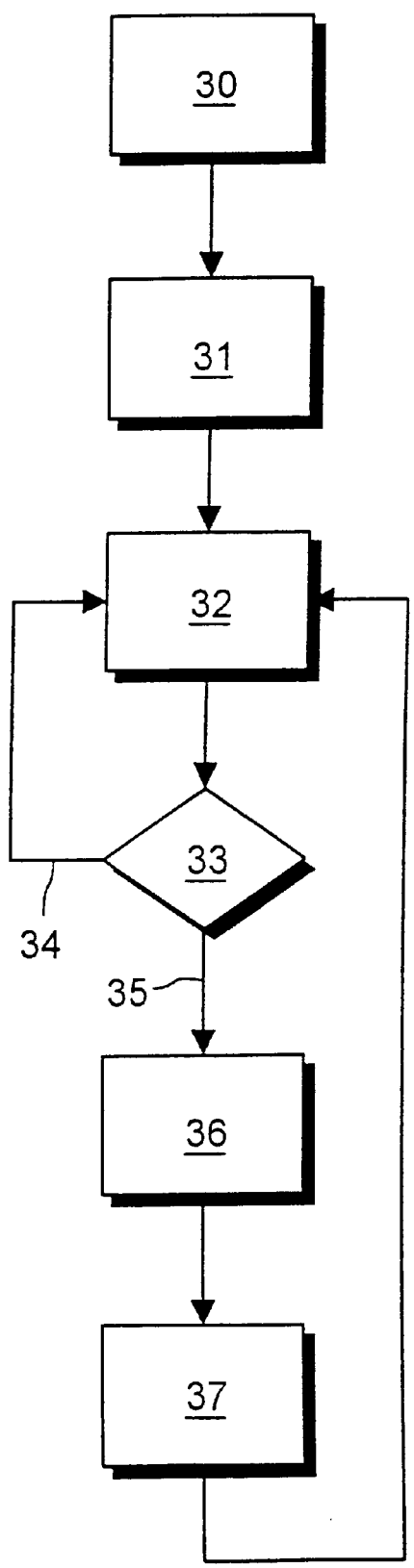
FIG. 3 shows a first embodiment of a method for controlling a heating current as a function of temperature.

FIG. 3 shows a first method for controlling a seat heater as implemented in logic circuit 8 of fully integrated seat heating controller 20. Activation 30 is followed by an initialization of variable H, which is set to 0 and represents the heating phase duration. In a further step, sensor temperature T of the NTC thermistor resistor is measured by the logic circuit; the heater is (still) off. The initialization step is identified by reference number 31, and the measurement of the sensor temperature by reference number 32. A further step carries out a comparison 33 between sensor temperature T and a target value of 30° C., for example. If the sensor temperature is higher than the target value, temperature measurement step 32 repeats in a repeat loop 34 until sensor temperature T drops below the target value. Heating loop 35 is then skipped and the heating phase duration is set in a step 36 by reading a heating phase duration H1, H2, H3, etc. from an "H-table" (see FIG. 4) depending on measured sensor temperature value T, with the heating phase duration increasing as the value of the measured sensor temperature decreases. This is followed by a heating phase 37, depending on the read and recorded heating phase duration; the heating current is then turned off again by the heating element. After heating phase 37, measurement step 32 of sensor temperature T repeats; at this point, the heater is turned off (again). Following step 32, the subsequent steps described above are repeated, so that, after a heating period with increasingly shorter heating phase durations, the temperature is maintained only by short heating phases that are interrupted by longer periods without any heating current.

According to the method present invention the seat temperature is measured by an integrated temperature sensor only during the current-free phase of heat development, i.e., when the integrated circuit-breaker is off. A new heating phase of the heater winding starts during this phase when the seat temperature drops below a certain threshold, while the system heating phase is controlled by a timer. The heating phase is activated for a longer period of time, the lower the seat temperature measured shortly before activation of the heating phase, e.g., based on a simple table assignment stored in (E)EPROM memory. The method adjusts the thermal coupling between the power output stage and temperature sensing element, and the associated intrinsic heating of the temperature sensor. The table assignment between the heating phase duration and the previous seat temperature must be made according to the application at hand.

Figures 4, 5:
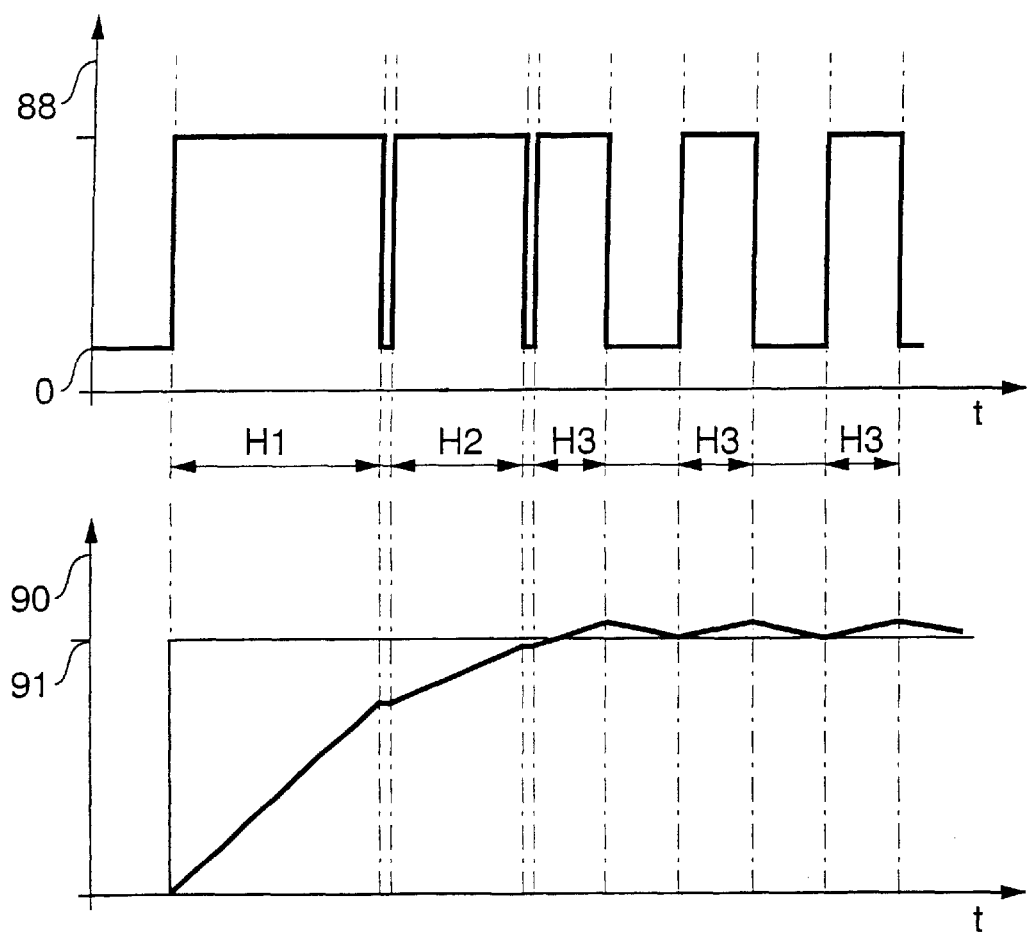
FIG. 4 shows a heating phase table.
FIG. 5 shows diagrams of the time dependence between a heating current and a seat temperature.

FIG. 4 shows a heating phase table, referred to in short as an H-table. It assigns heating phase durations H to ranges of sensor temperatures T, for example a 10-minute heating phase duration value Hi to the range between −40° C. and 30° C. A value of 3 minutes is assigned to the temperature range between −30° C. and −10° C., a value H3 of 0.5 minutes to the temperature range between −10° C. and +10° C., and the same value of 0.5 minutes to the temperature range between 10° C. and +30° C. This table is stored, for example, in a programmable or read-only memory of logic circuit 8, and is used as shown in FIG. 3.

FIG. 5 shows typical time dependencies between heating current 88 and seat temperature 90. Consecutive heating phase durations H1, H2 and H3 become shorter as the time increases, since the seat temperature rises over time. The heating periods are interrupted by short periods in which the temperature at the sensor element, i.e., at the NTC thermistor resistor, is measured, as illustrated in FIG. 3. When seat temperature 90 reaches target value 91, the seat temperature is maintained at the target value only by periodic, short heating phase durations 3. Phases without any heating current correspond to the phases in FIG. 3 in which the sequence cycles through repeat loop 34.

Figure 6:
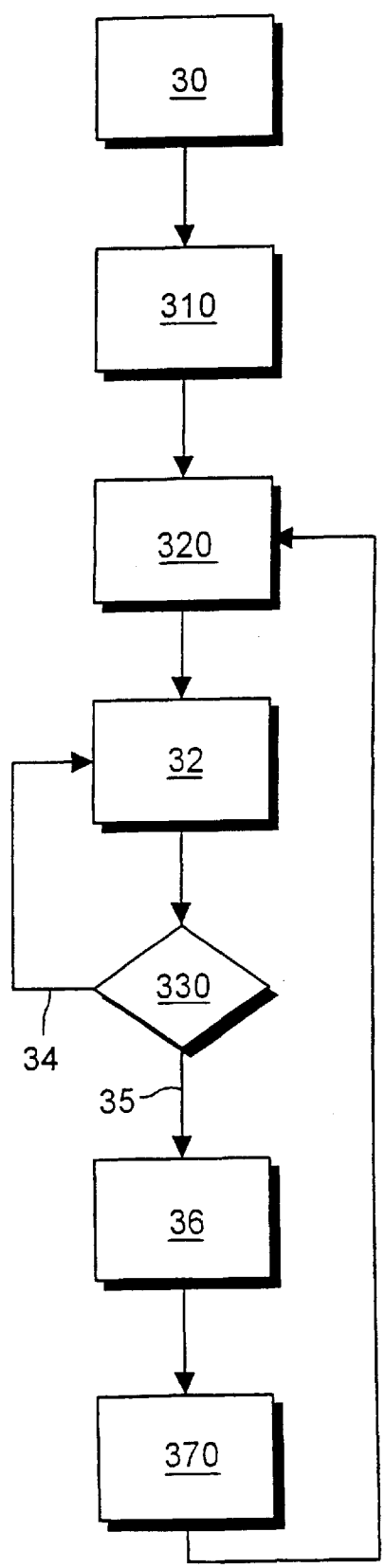
FIG. 6 shows a second embodiment of a method for controlling a heating current as a function of temperature.

FIG. 6 shows a second seat heating control method in which the same reference numbers identify the same steps as in FIG. 3. Activation 30 is followed by an initialization 310 of variable A; the latter is set to 0 and represents the previous heating phase duration. The sensor temperature setpoint is set in a further step 320, in which a sensor temperature setpoint S is read and recorded from an S-table (see FIG. 7) stored in a memory, depending on previous heating phase duration A. This is followed by the measurement of sensor temperature T (step 32), and a further step involves a comparison 330 between sensor temperature T and sensor setpoint S. If sensor temperature T is higher than sensor temperature setpoint S, the measurement of sensor temperature 32 repeats via repeat loop 34. However, if the value of sensor temperature T is less than sensor temperature setpoint S, the heating phase duration is set via heating loop 35 (step 36), as explained in the description of FIG. 3 above. The heating phase is then activated depending on the heating phase duration selected earlier. At the end of the heating phase duration, the current is turned off and the value of the heating phase duration just used is assigned to variable A. The heating phase as well as the subsequent current cutoff and reassignment of variable A are identified as step 370. The sequence then returns to step 320, and the sensor temperature setpoint is set again, depending on the new value assigned to variable A. The sequence then cycles through the subsequent steps, which are described above, until the seat temperature reaches a target value of approximately 30° C.

The method according to FIG. 6 is improved over the method according to FIG. 3, since the set temperature value is adjusted to the duration of a previous heating phase based on a further table assignment (S-table), thus compensating for the thermal inertia of the component and providing faster measurement of the seat temperature. A long heating phase directly preceding this step means that the true seat temperature value is still considerably lower than the temperature measured by the sensor element, i.e., sensor temperature value T. This "error" continues to occur even if the heating current is turned off at the time of the temperature measurement, as is the case in the examples illustrated in FIGS. 3 and 6. Varying the sensor temperature setpoint largely compensates for this "error".

Figure 7:
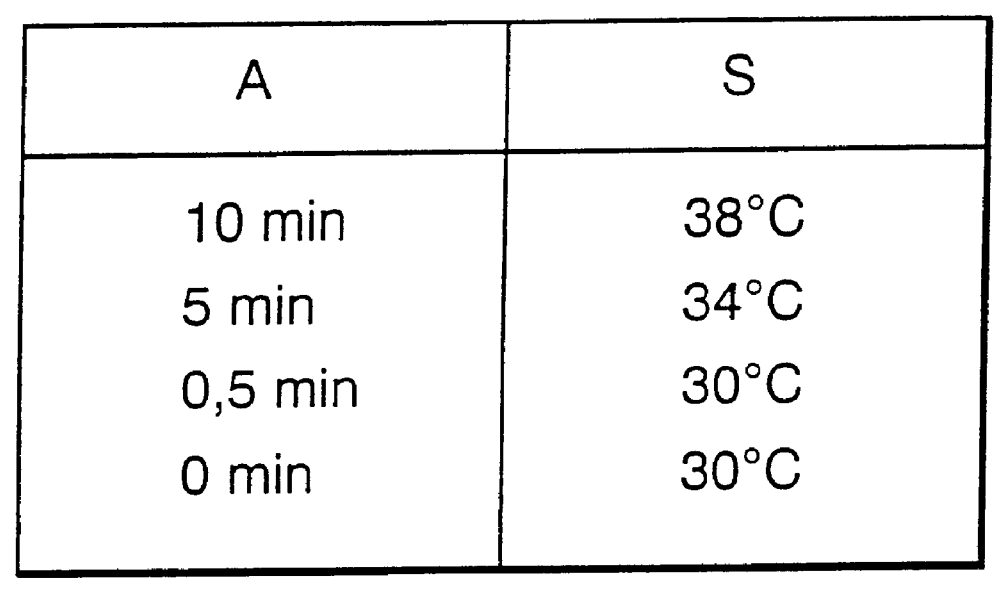

FIG. 7 shows a sensor temperature setpoint table, referred to in short as an S-table. This S-table assigns sensor temperature setpoints S to preceding heating phase durations A. A setpoint of 38° C. is assigned to a value A of 10 minutes, a setpoint S of 34° C. to a value of 5 minutes, a sensor temperature setpoint of 30° C. to a value of 0.5 minutes, and a setpoint of 30° C., which corresponds to the target value, to a preceding heating phase duration of 0 minutes (i.e., immediately after activation).

This S-table is advantageously stored in a further (E)EPROM memory or ROM memory and assigned to logic circuit 8. The stored values are accessed according to the second method illustrated in FIG. 6.

What is claimed is:

1. A method for controlling a heating current of a seat heater as a function of temperature, the seat heater having a sensor element for measuring a seat temperature, comprising the steps of:
   after activating the seat heater, recording the seat temperature;
   setting a heating phase duration as a function of a difference between the seat temperature and a comparison value;
   activating a heating current for a duration of one heating phase;
   rerecording the seat temperature;
   selecting a new value for the heating phase duration as a function of the rerecorded seat temperature;
   reactivating the heating current for the duration of the new value; and
   at alternate times, repeating the steps of rerecording and reactivating as a function of newly selected heating phase durations.

2. The method according to claim 1, further comprising the step of:
   reading a relationship between the heating phase and a previously recorded seat temperature from a H-Table.

3. The method according to claim 2, further comprising the steps of:
   after activating the seat heater, initializing the heating phase duration;
   recording the seat temperature;
   comparing the recorded seat temperature to the comparison value; and
   activating the heating current for a heating phase duration read from the H-table based on the recorded seat temperature.

4. The method according to claim 1, further comprising the step of:
   varying the comparison value as a function of a preceding heating phase duration.

5. The method according to claim 4, further comprising the step of:
   reading a seat temperature setpoint from a S-Table, the seat temperature set point being used as a comparison value, the S-Table providing different seat temperature setpoints for various preceding heating phase durations.

6. The method according to claim 4, further comprising the step of:
   after activating the seat heater, initializing the heating phase duration;
   setting the comparison value;
   recording the seat temperature;
   comparing the recorded seat temperature to the comparison value; and
   activating the heating current for a heating phase duration read from the H-table based on the recorded seat temperature.

7. A circuit for controlling a heating current of a seat heater as a function of temperature, comprising:
   a sensor element that supplies a seat temperature-dependent signal;
   a logic circuit, the logic circuit and the sensor element being integrated as one of a hybrid component and a monolithic component on a chip; and
   a circuit-breaker drivable by the logic circuit to control the heating current, wherein:
   after activation of the seat heater, the sensor element records a seat temperature,
   the logic circuit sets a heating phase duration as a function of a difference between the seat temperature and a comparison value,
   then, the logic circuit activates the circuit-breaker for one heating phase duration,
   subsequently, the sensor element re-records the seat temperature,
   the logic circuit selects a new value for the heating phase duration as a function of the rerecorded seat temperature, and reactivates the heating current for the duration of the new value, and
   further recordings of the seat temperature and activations of the heating current are performed at alternate times as a function of newly selected heating phase durations.

8. The circuit according to claim 7, wherein:
   the circuit-breaker is integrated on the one of the hybrid component and the monolithic component on a chip.

9. The circuit according to claim 7, wherein:
   the circuit-breaker is arranged on a second chip.

10. A seat heating arrangement with a circuit for controlling a heating current of a seat heater as a function of temperature, comprising:
   a sensor element that supplies a seat temperature-dependent signal;
   a logic circuit, the logic circuit and the sensor element being integrated as one of a hybrid component and a monolithic component on a chip; and a circuit-breaker drivable by the logic circuit to control the heating current, wherein:

after activation of the seat heater, the sensor element records a seat temperature, the logic circuit sets a heating phase duration as a function of a difference between the seat temperature and a comparison value, then, the logic circuit activates the circuit-breaker for one heating phase duration, subsequently, the sensor element rerecords the seat temperature, the logic circuit selects a new value for the heating phase duration as a function of the rerecorded seat temperature, and reactivates the heating current for the duration of the new value, and further recordings of the seat temperature and activations of the heating current are performed at alternate times as a function of newly selected heating phase durations.

11. The arrangement according to claim 10, wherein:

the circuit-breaker is integrated on the one of the hybrid component and the monolithic component on a chip.

* * * * *